United States Patent [19]

Charron

[11] 4,122,679

[45] Oct. 31, 1978

[54] METHOD AND MEANS FOR PRE-HEATING THE INTAKE AIR OF A SUPERCHARGED, LOW-COMPRESSION RATIO DIESEL ENGINE WHEN OPERATING AT LOW LOAD

[75] Inventor: Francis Charron, Croissy-sur-Seine, France

[73] Assignee: Societe d'Etudes de Machines Thermiques, Saint Denis, France

[21] Appl. No.: 729,977

[22] Filed: Oct. 6, 1976

Related U.S. Application Data

[63] Continuation of Ser. No. 491,750, Jul. 25, 1974, abandoned.

[30] Foreign Application Priority Data

Aug. 10, 1973 [FR] France .................................. 73 29429

[51] Int. Cl.² ............................................. F02B 29/04
[52] U.S. Cl. ..................... 60/599; 60/39.51 H; 60/611
[58] Field of Search ................... 60/598, 595, 39.51 H, 60/599, 600, 611; 123/122 D

[56] References Cited

U.S. PATENT DOCUMENTS

| | | | |
|---|---|---|---|
| 3,421,314 | 1/1969 | Michalke | 60/611 |
| 3,450,109 | 6/1969 | Gratzmiller | 60/598 |
| 3,559,403 | 2/1971 | Hryniszak | 60/39.51 H |

*Primary Examiner*—Ronald H. Lazarus
*Attorney, Agent, or Firm*—Kenyon & Kenyon, Reilly, Carr & Chapin

[57] ABSTRACT

A device for and process of pre-heating the intake air of a supercharged, low-compression ratio Diesel engine when operating at low loads, comprising the apparatus for and steps of taking the heat required for said pre-heating from at least one portion of the exhaust gases of said engine and conveying it to at least one part of the intake air. The device includes heat exchange apparatus having a heating fluid inlet connected to the diesel engine exhaust line through a three-way valve, a heating fluid outlet, a heated fluid inlet, a heated fluid outlet connected to the intake air duct of the engine, and a heat conveying means moving in a closed path between the heating fluid and the heated fluid. A temperature sensor in the air intake duct controls the three-way valve to apportion the flow of exhaust gases between the heating fluid inlet and the atmosphere to maintain a predetermined minimum intake air temperature.

19 Claims, 9 Drawing Figures

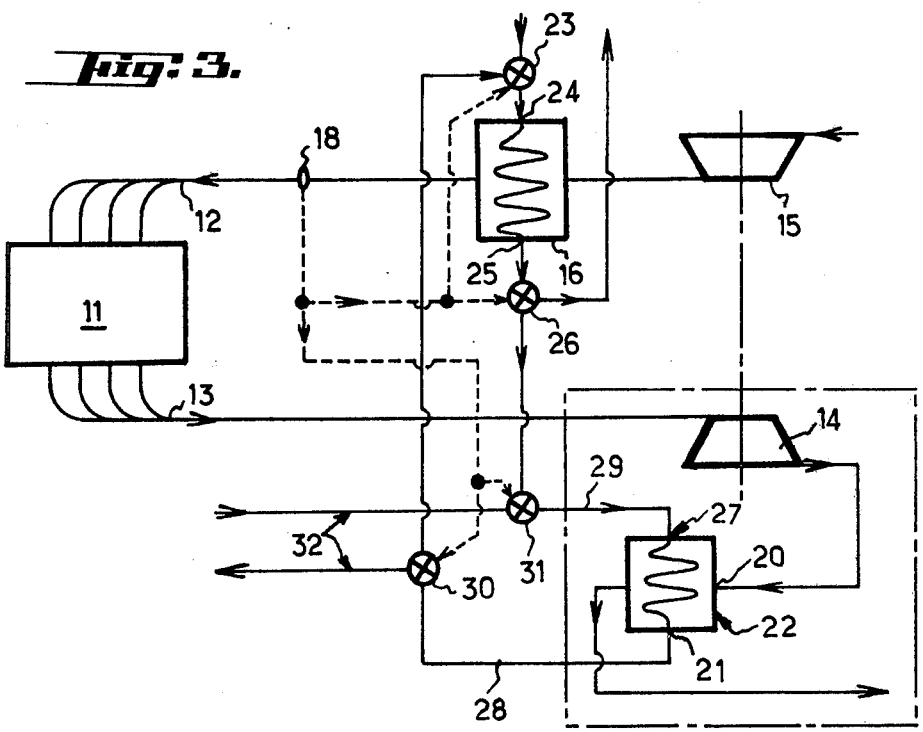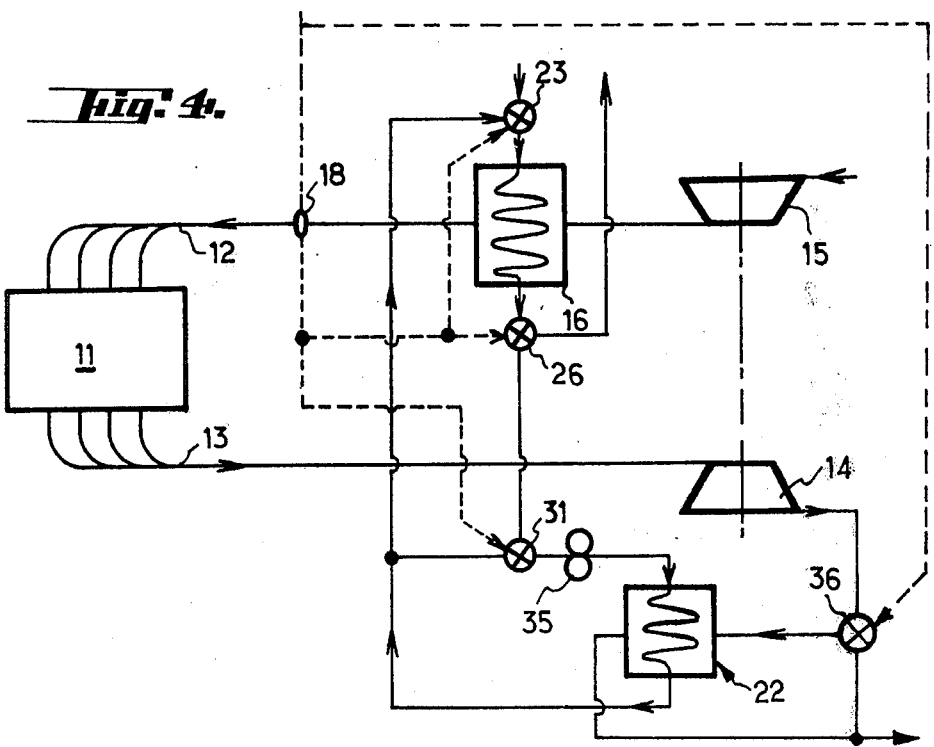

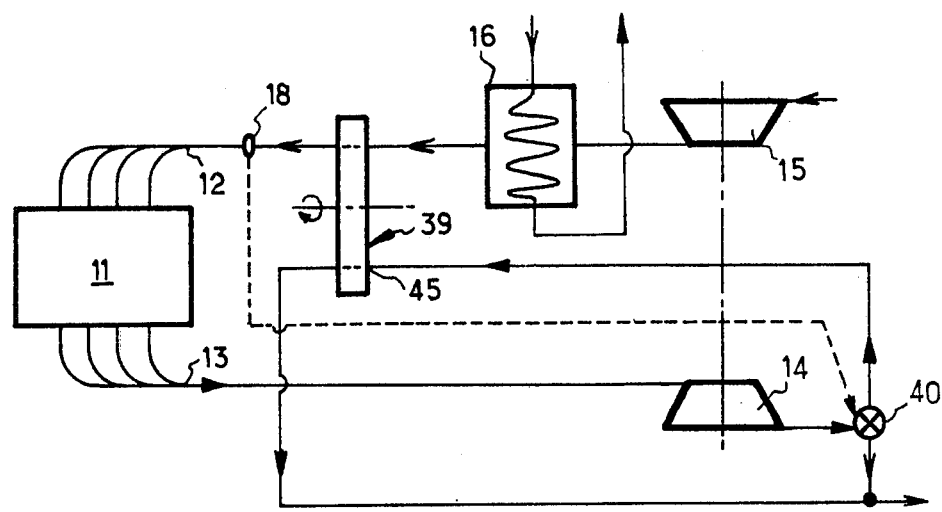
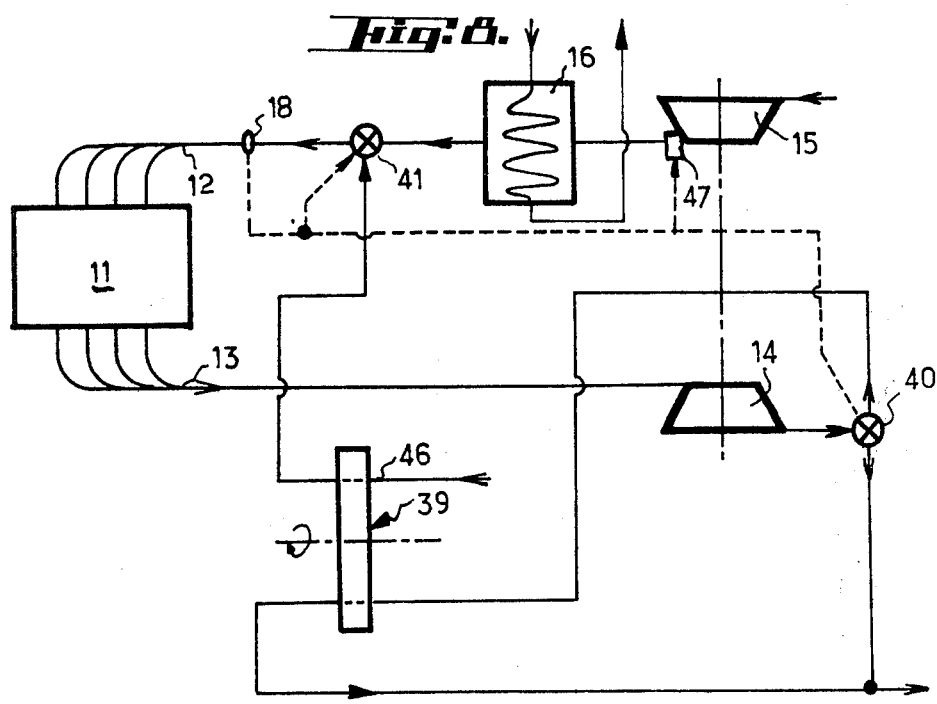

METHOD AND MEANS FOR PRE-HEATING THE INTAKE AIR OF A SUPERCHARGED, LOW-COMPRESSION RATIO DIESEL ENGINE WHEN OPERATING AT LOW LOAD

This is a continuation of application Ser. No. 491,750 now abandoned filed July 25, 1974.

BACKGROUND OF THE INVENTION

The present invention relates essentially to a method and means for pre-heating the intake air of a supercharged Diesel engine in particular of low compression ratio when operating at low loads.

It is well known in the prior state of the art that for increasing the power of a supercharged Diesel engine, it is possible to increase the pressure of the pre-compressed intake air supplied by the supercharging system and therefore the weight of combustion-supporting air fed into the engine cylinders hence to correlatively increase the amount of fuel injected for every working cycle of engine operation. In supercharged Diesel or like internal combustion engines, the supercharging air is delivered and compressed by one or several exhaust gas-driven turbo-blowers or like turbine-driven boosters or air compressors discharging into the intake manifold of the engine and consisting generally of an air compressor or booster mechanically coupled to a turbine usually driven by the exhaust gases issuing from each exhaust manifold of the engine. It is generally advantageous or necessary to cool the intake air which has thus been heated or warmed through compression by means of at least one final air cooler or aftercooler located between the intake manifold and the compressor to thereby again increase the weight of air forced into the cylinders for a same displaced volume and at the like time to keep the temperature during the working cycle of the engine at a suitable level.

For a given volumetric compression ratio of the engine it is however not possible to indefinitely increase the ratio of supercharging, i.e., the ratio of the actual pressure of the precompressed intake air to atmospheric pressure, hence the pressure of the supercharging air, because with highly supercharged engines excessive combustion pressures would result therefrom which would overstress the component elements, members or parts of the engine. To overcome such a drawback one is then led to reduce the volumetric compression ratio of the engine.

On the other hand such a decrease in the volumetric compression ratio of the engine is subjected to limitation since a decrease below a certain limit value of for instance 12 results however in the inconvenience of making difficult the start and operation under low-load conditions in particular at idling speed, i.e., under no load or slow running conditions of the engine because the temperature of the intake air after pre-compression is not high enough to cause self-ignition of the injected fuel.

SUMMARY OF THE INVENTION

One main object of the invention is therefore to remove the aforesaid inconveniences while enabling thereby an increase of the rated or maximum power of the supercharged Diesel engine for a given or same piston stroke displacement or swept volume, i.e., cylinder capacity thereof, in particular through pre-heating the intake air under low-load operating conditions. To solve the technical problem set the invention provides an improved process of running or conditioning a supercharged, in particular low volumetric compression ratio Diesel engines in particular at start and possibly also under low-load or partial load operating conditions of the engine, by pre-heating the intake air supply, said method being characterized by the steps consisting in taking the heat required for said pre-heating from at least one part of the exhaust gases of the engine and in conveying it to at least one portion of the intake air.

The invention relates also to a device for carrying out the aforesaid method, in particular in the case of an engine supercharged by at least one exhaust gas-driven turbo-blower set including an exhaust gas-driven turbine connected to the exhaust manifold of the engine and operatively coupled mechanically to a supercharging air compressor or booster, the outlet or discharge side of which is connected to the intake air manifold possibly through an air cooler, said device being characterized in that it comprises heat exchanging means connected on the one hand to the exhaust manifold forming a heat supply source and on the other hand to the intake manifold.

In a preferred embodiment, the device includes heat exchange apparatus having a heating fluid input for receiving exhaust gases from the engine, a heating fluid output for the exhaust gases, a heated fluid input for receiving intake air for the engine, a heated fluid output for delivering heated intake air to the air intake duct of the engine, and a heat conveying means moving in a closed path of travel adapted to be in heat transfer relation with engine exhaust gases flowing between the heating fluid input and output for one part of the closed path and in heat transfer relation with engine intake air flowing between the heated fluid input and output for another part of the closed path. A controllable three-way valve is located in the exhaust duct and has an outlet connected to the heating fluid input of the heat exchange apparatus. Means for operating the three-way valve to selectively control the flow of exhaust gases to the heating fluid inlet preferably comprise a sensor means located in the air intake duct downstream of said heated fluid output for sensing the temperature of the intake air entering the engine; and a servo-control system connected to said sensor and to said controllable valve for selectively operating the valve to apportion the flow of exhaust gases between said heat exchange apparatus and the atmosphere for maintaining the intake air above a predetermined minimum temperature.

At start the air may be pre-heated by an auxiliary burner which will not be described.

The invention will be better understood and further objects, characterizing features, details and advantages thereof will appear more clearly as the following explanatory description proceeds with reference to the accompanying diagrammatic drawings given by way of non-limiting examples only, illustrating several presently preferred embodiments of the invention and wherein:

FIG. 3 shows a diagrammatic view illustrating a second embodiment of the pre-heating device according to the invention;

FIG. 4 is a diagrammatic view showing an alternative embodiment of the device illustrated in FIG. 3;

FIG. 7 is a diagrammatic view showing another preheating device according to the invention;

FIG. 8 is a diagrammatic view showing an alternative embodiment of the device illustrated in FIG. 7.

Figure 1:
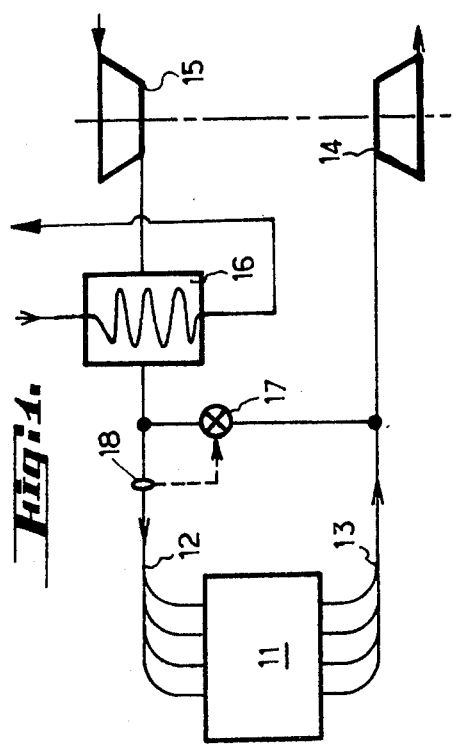
FIG. 1 shows a diagrammatic view of a device for preheating the intake air according to a first embodiment of the invention.

The device diagrammatically shown in FIG. 1 comprises a Diesel engine 11 provided with its intake manifold 12 and its exhaust manifold 13. This exhaust manifold is connected to the inlet of a turbine 14 driving a rotary compressor 15 the discharge side or outlet of which is connected to the intake manifold downstream of an air aftercooler 16. A valve 17 inserted between the exhaust manifold 13 and the intake manifold 12 downstream of the aftercooler is actuated by a temperature-responsive sensor 18 which is in thermal contact with the intake air, through the medium of a servo-control, follow-up or phase-lock system not described and diagrammatically shown in broken lines in the drawings.

The turbine 14 is driven by the exhaust gases and rotates the compressor 15 which discharges the compressed air towards the intake manifold through the aftercooler 16. When the temperature of the intake air becomes too low, owing to the operation of the engine under low-load conditions the sensor 18 operates the valve 17 to cause same to open, thereby enabling a direct mixture of one part of the hot exhaust gases from the engine with the intake air and accordingly the preheating of the latter.

Figure 2:
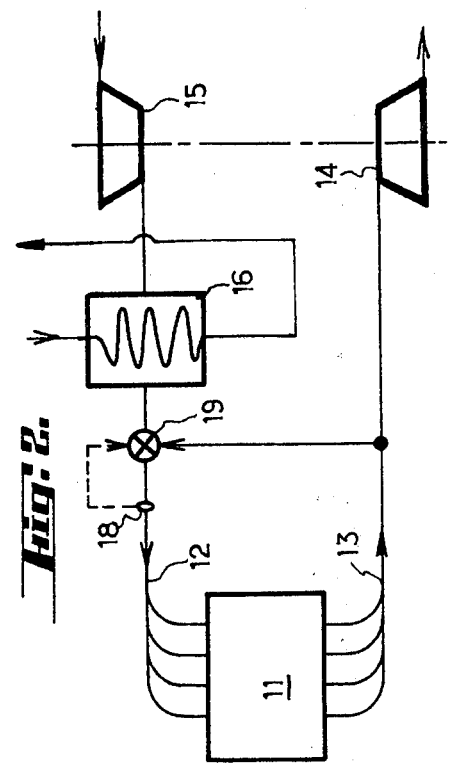
FIG. 2 shows a diagrammatic view of an alternative embodiment of the device shown in FIG. 1.

The device diagrammatically illustrated in FIG. 2 is a modification of the previous one; it differs therefrom by the fact that the valve 17 is replaced by a controllable three-way valve 19 inserted into the intake manifold and operated as previously by the sensor 18. This three-way valve which advantageously acts gradually enables metering or adjustment of the mixture between the intake air and the exhaust gases; the valve 19 is so designed as to always leave a communication between the compressor and the intake manifold to avoid hunting of the compressor.

The device according to the invention as diagrammatically shown in FIG. 3 differs from the previous ones in that the heat exchange between the exhaust gases and the intake air is effected through the medium of an auxiliary heat-conveying fluid such as water, for instance, and no longer through direct mixture of the exhaust gases with the intake air. The device comprises as previously the Diesel engine proper 11, the turbine 14, the compressor 15, the aftercooler 16 and the temperature-responsive sensor 18. It includes in addition a heat exchanger 22, the heating fluid inlet 20 of which is connected to the exhaust manifold downstream of the turbine, and the heated heat-conveying fluid outlet 21 of which is branched, through the medium of a controllable three-way valve 23, in by-passing relationship off the cooling fluid inlet 24 of said aftercooler the cooling fluid outlet 25 of which is branched through the medium of a controllable three-way valve 26 in by-passing relationship off the cooled heat-carrying fluid inlet 27 of said exchanger 22. Each heat-conveying fluid duct 28 and 29 may be connected respectively through controllable three-way valves 30 and 31, to a circuit 32 for external utilization or consumption of heat. The valves 23, 26, 30 and 31 are all actuated by the same temperature-responsive sensor 18 through the medium of a servo-control system not described. The device operates as follows: the exhaust gases when flowing through the exchanger 22 heat up the heat-carrying fluid. As long as the intake air temperature is high enough, the heat-conveying fluid circulates owing to the positions of the valves 30 and 31 in said outer utilization circuit 32; the valves 23 and 26 are in such a position that the cooling fluid normally flows through the after cooler 16. When the intake air temperature becomes too low, due to the operation of the engine under low-load operating conditions, the sensor 18 causes the tripping of the valves 23, 26, 30 and 31, the heat-conveying fluid stops flowing through the circuit 32 and replaces the cooling fluid within said aftercooler 16, which then operates as a heat exchanger and pre-heats the intake air.

The device according to the invention as diagrammatically shown in FIG. 4 is an alternative embodiment of the device previously described, where the outer utilization circuit 32 has been omitted. The valve 30 may therefore be omitted and a pump 35 is inserted into the heat-conveying fluid circuit for allowing the forced circulation of said heat-conveying fluid in a closed circuit during engine operation under normal load-conditions, the valve 36 providing for a permanent leakage or bleed towards the preheater 22 in order to keep the heat-conveying fluid at a suitable temperature.

Figure 5:
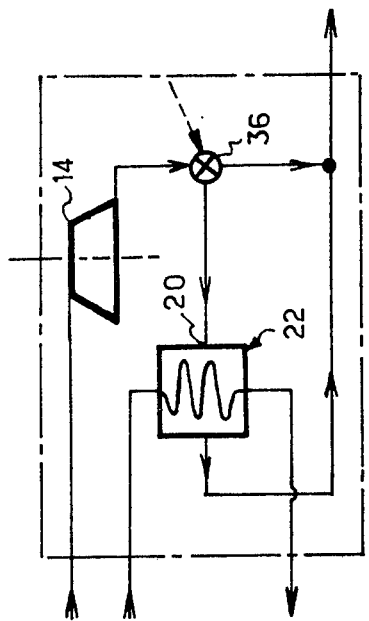
FIGS. 5 and 6 are diagrammatic views showing detail modifications which may be made to the device illustrated in FIG. 3.
Figure 6:
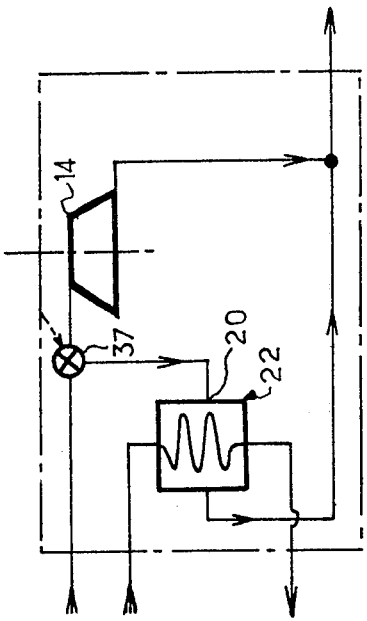

Detail improvements diagrammatically shown in FIGS. 5 and 6 may be made to the devices diagrammatically illustrated in FIG. 3 or 4. These improvements relate to the connection of the heating fluid input 20 of said exchanger 22 to the exhaust manifold. According to FIG. 5 said input 20 is branched in by-passing relationship through the medium of a controllable three-way valve 36 desirably acting gradually, off the exhaust manifold downstream of the turbine 14. According to FIG. 6 said input 20 is branched in by-passing relationship through the medium of a controllable three-way valve 37, desirably acting gradually, off the exhaust manifold upstream of said turbine. The valve 36 or 37 is of course controlled by the same sensor 18 and always leaves a communication between the exhaust manifold and the input 20 of the exchanger 22 for maintaining said heat-carrying fluid at a certain temperature.

The device according to the invention as diagrammatically shown in FIG. 7 differs from the previous ones in that the heat exchange between the exhaust gases and the intake air is effected through the medium of a rotary regenerative heat exchanger 39 known per se. The device comprises as previously the engine 11, the turbine 14, the compressor 15 and the aftercooler 16. According to the device illustrated in FIG. 7, the heating fluid input 45 is branched in by-passing relationship, through the medium of a controllable three-way valve 40, off the exhaust manifold downstream of the turbine, said exchanger being inserted in series directly into the intake manifold. The operation of the device is the following: said regenerative heat exchanger is heated up when being contacted by the exhaust gases and is cooled down when being contacted by the intake air while giving off its heat to said intake air. The valve 40 is of course actuated by the sensor 18. The valve may desirably provide a permanent bleed or leakage to keep the regenerative pre-heater 39 at a suitable temperature.

The device according to the invention as diagrammatically shown in FIG. 8 is a modification of the device previously described. This alternative embodiment is useful because it is not always possible to insert said regenerative heat exchanger 39, which is generally very bulky, into the intake manifold. The device diagrammatically illustrated in FIG. 8 distinguishes over the previous one in that said regenerative exchanger 39 has its heated fluid input 46 in communication with the open air and its heated fluid output connected to the intake manifold through the medium of a controllable three-way valve 41 inserted into the intake manifold. A pressure-releasing member 47 controlled at the same time as the valves 40 and 41 and inserted between said valve 41 and the compressor 15 enables venting of the latter to the open air. The device operates as follows: the atmospheric air drawn or sucked in through the inlet 46 of said regenerative exchanger 39 is pre-heated and conveyed into the intake manifold as soon as the valve 41 is controlled by the sensor 18 at the same time as the pressure-releasing member 47, which opens to release any compression downstream of this member.

Figure 9:
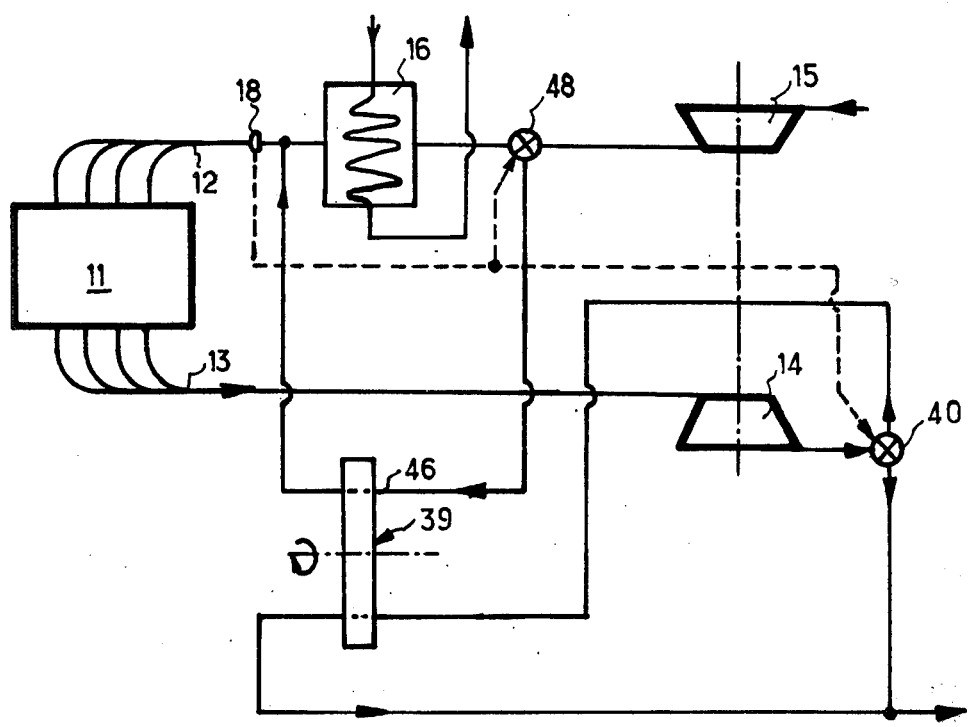
FIG. 9 is a diagrammatic view showing a modification of the device illustrated in FIG. 8.

The device according to the invention as diagrammatically shown in FIG. 9 is an alternative embodiment of the device illustrated in FIG. 8 previously described. In this modification, the air flowing through the regenerative air pre-heater 39 is taken, in by-passing or branching-off relationship, from the air intake manifold 12 before the aftercooler 16 through the medium of a three-way valve 48, possibly acting gradually.

It should be understood that the invention is not at all limited to the examples described, which have been given by way of illustration only. In particular it is quite possible to combine the device diagrammatically shown in one of FIGS. 1, 2, on the one hand, with the device diagrammatically shown in one of FIGS. 3 and 4, on the other hand. In the last but one example referred to, the pressure-releasing member may be replaced by a controllable releasable, or disconnectable coupling inserted into the mechanical transmission or gearing between the turbine and the compressor. The supply of compressed air may also be stopped or discontinued by placing the three-way valve 40 upstream of the turbine; said valve when it is operated by the sensor 18 prevents the exhaust gases from flowing through said turbine.

The invention therefore covers all the technical equivalents of the means used and described as well as their combinations if the same are carried out according to the gist of the invention and within the scope of the appended claims.

What is claimed is:

1. In combination with a supercharged low compression ratio diesel engine including an exhaust duct, an air intake duct, an exhaust gas-driven turbine connected in said exhaust duct and having an inlet for receiving exhaust gases from said engine and an outlet for said gases, a supercharging air compressor, means operatively coupling said turbine to said compressor, said compressor having a discharge outlet connected to said air intake duct and an aftercooler located in the intake duct downstream of the supercharging air compressor and having a cooling fluid inlet adapted to be connected to a source of cooling fluid and a cooling fluid outlet, a device for preheating the intake air to said engine, said device comprising:

heat exchange apparatus having a heating fluid input for receiving exhaust gases from the engine, a heating fluid output for the exhaust gases, a heated fluid input for receiving intake air for the engine, a heated fluid output for delivering heated intake air to the air intake duct of the engine, and a heat conveying means moving in a closed path of travel adapted to be in heat transfer relation with engine exhaust gases flowing between the heating fluid input and output for one part of the closed path and in heat transfer relation with engine intake air flowing between the heated fluid input and output for another part of the closed path;

a controllable three-way valve located in said exhaust duct and having an outlet connected to said heating fluid input of said heat exchange apparatus; and means for operating said three-way valve to selectively control the flow of exhaust gases to the heating fluid input of said heat exchange apparatus for heating said heat conveying means in the one part of said closed path.

2. A device according to claim 1 wherein the heated fluid input of said heat exchange apparatus is inserted in series with said supercharging air compressor.

3. A device according to claim 1 wherein the heated fluid input of said heat exchange apparatus communicates with the open air and further comprising an additional controllable three-way valve located in said intake duct and connecting said heated fluid output to said intake duct.

4. A device according to claim 1 comprising an additional controllable three-way valve located in said intake duct and connecting the heated fluid input of said heat exchange apparatus to the outlet of said supercharging air compressor and wherein the heated fluid output is connected to said intake manifold.

5. A device according to claim 1 wherein the means for operating said three-way valve comprises:

a temperature sensor located in the intake duct downstream of the air compressor for sensing the temperature of the intake air and a servo-control means connected to said sensor and said controllable three-way valve for selectively operating the valve to maintain the temperature of the intake air above a predetermined temperature.

6. A device according to claim 1 wherein the controllable three-way valve is connected to the outlet of the exhaust gas-driven turbine and has an additional outlet opening to the atmosphere.

7. A device according to claim 1, wherein said three-way valve operates in a continuously variable manner and has a permanent bleed communication between said exhaust manifold and said heat exchange apparatus for maintaining the heat conveying means at a suitable temperature.

8. A device according to claim 1 wherein the heat conveying means is a heat transfer fluid, and the closed path includes a supply conduit leading from the one part of the closed path and a return conduit leading to the one part of the path, the device further comprising:

a first additional controllable three-way valve located in the cooling fluid inlet of the aftercooler and having an inlet connected to the supply conduit;

a second additional controllable three-way valve located in the cooling fluid outlet of the aftercooler and having an outlet connected to the return conduit;

a pump connected in the closed path for circulating the heat transfer fluid therethrough; and means for operating said first and second additional controllable three-way valves to selectively permit either flow of the heat transfer fluid in the closed path through the aftercooler or flow of cooling fluid through the aftercooler.

9. A device according to claim 8 further comprising:
a third additional controllable three-way valve located in the return conduit;
a bypass line connecting the third additional three-way valve to the supply line between the one part of the closed path and the first additional three-way valve to form a bypass circuit including said one part of the closed path, the pump being located in said bypass circuit; and
means for operating the third additional three-way valve to open the bypass circuit when the first and second additional three-way valves are operated to permit flow of cooling fluid through the aftercooler, thereby providing a recirculating bypass path for the pump when the heat transfer fluid is not flowing through the aftercooler.

10. A device according to claim 5 wherein the heat exchange apparatus comprises a rotary regenerative heat exchanger, and the heat conveying means comprises a revolving heat-storage member.

11. A device according to claim 10 wherein the heated fluid output of said rotary regenerative heat exchanger is branched into the intake duct downstream of the aftercooler.

12. A device according to claim 10 wherein the heated fluid inlet of the rotary regenerative heat exchanger is open to the atmosphere, the device further comprising another controllable three-way valve located in the intake duct downstream of the supercharging air compressor and having an inlet connected to the heated fluid outlet of the rotary regenerative heat exchanger;
means for operating said other three-way valve for permitting flow of preheated intake air from the heated fluid outlet into the intake duct of the engine; and
means operable for stopping air compression by said supercharging air compressor in cooperation with said means for operating the other three-way valve.

13. A device according to claim 12 wherein the other controllable three-way valve is continuously variable, and wherein the means for operating the other controllable three-way valve and the means for stopping air compression are connected to said sensor for operation in response thereto in cooperation with said servo-control means for operating the first-mentioned controllable three-way valve means.

14. A device according to claim 12, wherein said air compression stop means comprises a pressure-relief valve located in said intake manifold between said other three-way valve and said supercharging air compressor.

15. A device according to claim 12, wherein said air compression stop means comprises said first-mentioned three-way valve said valve being located in said exhaust duct upstream of said exhaust gas-driven turbine so that the flow of exhaust gases through said turbine may be selectively prevented by means of said three-way valve.

16. A device according to claim 10 further comprising:
another controllable three-way valve located in the intake duct between the supercharging air compressor and the aftercooler, the other three-way valve having an outlet connected to the heated fluid inlet of the rotary regenerative heat exchanger;
a conduit having one end connected to the heated fluid outlet of the rotary regenerative heat exchanger and an opposite end branched into the intake duct downstream of the aftercooler; and
means for operating said other three-way valve for selectively permitting flow of intake air from said supercharging air compressor to the engine through the aftercooler and through the rotary regenerative heat exchanger.

17. A device according to claim 16 wherein the other controllable three-way valve is continuously variable, and the means for operating the other controllable three-way valve is connected to said sensor for operation in response thereto in cooperation with said servo-control means for operating the first-mentioned controllable three-way valve means.

18. A device according to claim 1, wherein said controllable valve is of the gradual action type.

19. A device according to claim 1 wherein said controllable valve is located in the exhaust duct downstream of the turbine.

* * * * *